United States Patent [19]

Perlmutter et al.

[11] Patent Number: 4,494,873
[45] Date of Patent: Jan. 22, 1985

[54] ELECTROMAGNETIC WAVE REFLECTIONS ABSORBER

[75] Inventors: Michael Perlmutter, Sherborn; Lawrence L. Clampitt, Wayland, both of Mass.

[73] Assignee: Raytheon Company, Lexington, Mass.

[21] Appl. No.: 235,320

[22] Filed: Feb. 17, 1981

[51] Int. Cl.³ ............................................. G01C 19/64
[52] U.S. Cl. ...................................... 356/350; 372/94
[58] Field of Search ............................. 356/350, 351; 350/276 SL, 375, 392; 372/19, 33, 94, 103, 105, 106, 703

[56] References Cited

U.S. PATENT DOCUMENTS 3,214,596 10/1965 Schwerdt, Jr. et al. ...... 350/276 SL
4,272,158 6/1981 Johnston, Jr. et al. ......... 356/350 X
4,284,329 8/1981 Smith et al. .................... 356/350 X

OTHER PUBLICATIONS

D. R. McKenzie, "Selective Nature of Gold-Black Deposits; Journal Optical Society of America, vol. 66, No. 3, Mar. 1976, pp. 249–253.

*Primary Examiner*—Vincent P. McGraw
*Attorney, Agent, or Firm*—Walter F. Dawson; Richard M. Sharkansky; Joseph D. Pannone

[57] ABSTRACT

A photon absorber minimizes the mixing of unwanted reflected electromagnetic waves with the main clockwise and counter-clockwise propagating electromagnetic waves of a ring laser gyroscope. A round hole in the middle of the absorber allows the main waves to pass and an angulated front surface deflects reflected waves away from the main waves. Most of the reflected waves which impinge on the photon absorber are absorbed. A photon absorber is fabricated from light absorbing filter glass with anti-reflection coatings or from beryllium-copper with an absorptive coating.

9 Claims, 15 Drawing Figures

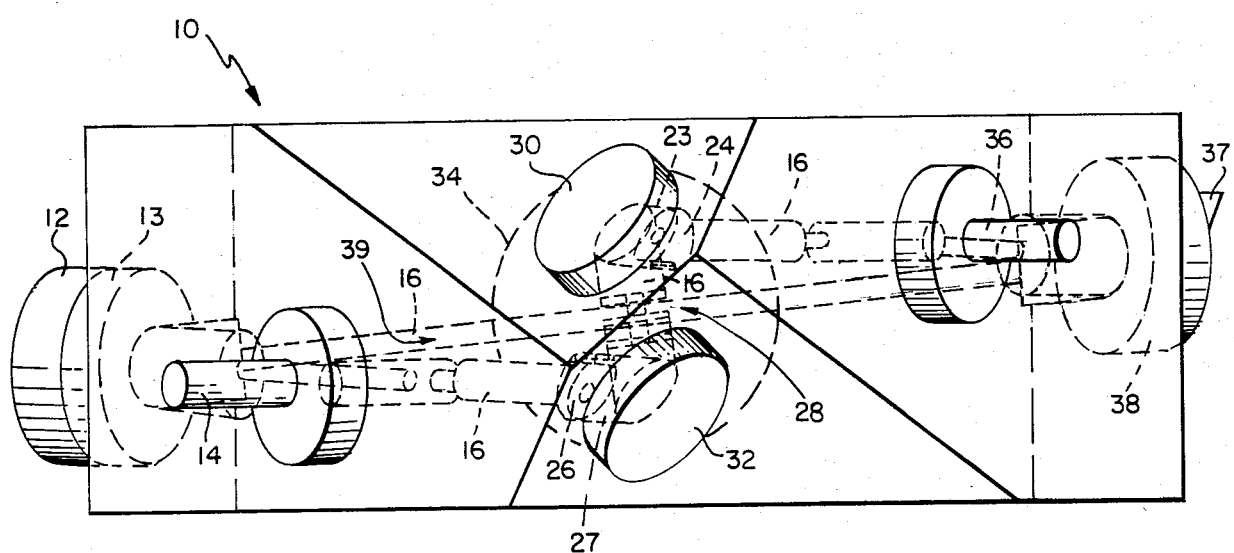

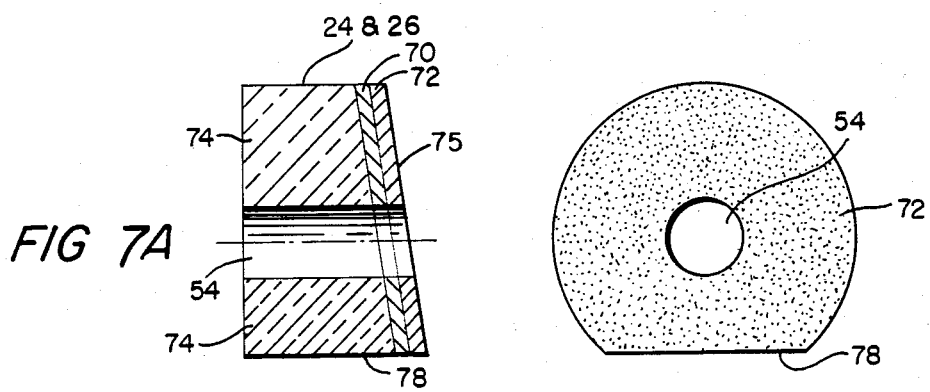
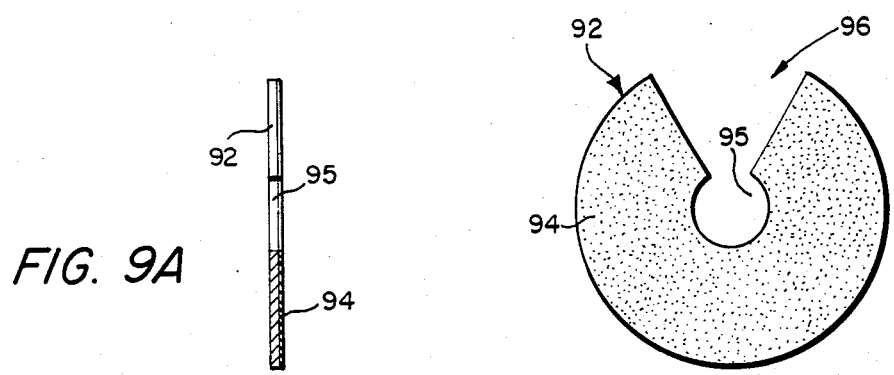
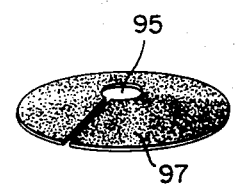

ELECTROMAGNETIC WAVE REFLECTIONS ABSORBER

BACKGROUND OF THE INVENTION

This invention relates to ring laser gyroscopes and more particularly, the invention relates to the absorption of reflected light energy or electromagnetic waves from intracavity elements such as a Faraday rotator.

One of the most significant ring laser gyroscopes yet proposed and constructed employs four waves of two pairs each propagating in opposite directions. Such systems are shown and described in U.S. Pat. Nos. 3,741,657, 3,854,819 and 4,006,989 to Keimpe Andringa and assigned to the present assignee, the specifications of those patents being herein incorporated by reference. In such laser systems, circular polarization for each of the four waves is used. The pair of waves, or beams, propagating in the clockwise direction includes both left-hand circularly polarized (LCP) waves and right-hand circularly polarized (RCP) waves as do those waves propagating in the counter-clockwise direction. This four-frequency or multi-oscillator ring laser gyro provides a means of circumventing the frequency locking or lock-in problem present in all conventional or two-frequency laser gyroscopes. This lock-in phenomenon occurs when two traveling waves propagating in opposite directions in a resonant cavity at slightly different frequencies are pulled toward each other to combine in a single frequency standing wave. However, when the frequencies of the counter-rotating waves are sufficiently separated in frequency, the pulling together does not occur. The four-frequency approach may be described as two independent laser gyros operating in a single stable resonator cavity, sharing a common optical path, but statically biased in opposite senses by the same passive bias element. In the differential output of these two gyros, the bias then cancels, while any rotation-generated signals add, thereby avoiding the usual problems due to drifts in the bias and giving a sensitivity twice that of a single two-frequency gyro. Because the bias need not be dithered, the gyro never passes through lock-in. Hence, there are no dither-induced errors to limit instrument performance. For this reason, the four frequency gyro is intrinsically a low noise instrument, and it is well suited for applications requiring rapid position update or high resolution.

The four different frequencies are normally generated by using two different optical effects. First, a crystal polarization rotator may be used to provide a direction-independent polarization causing the resonant waves to be circularly polarized in two directions. The polarization rotation results from the refractive index of the rotation medium being slightly different for RCP and LCP waves. Alternatively, a non-planar ring path may be used which inherently supports only circularly polarized waves without the use of a crystal rotator. A non-planar electromagnetic wave ring resonator is shown and described in U.S. Pat. No. 4,110,045 to Irl W. Smith, Jr. and Terry A. Dorschner and assigned to the present assignee. Second, a Faraday rotator is used to provide nonreciprocal polarization rotation, by having a slightly different refractive index for clockwise (cw) traveling waves than for counter-clockwise (ccw) traveling waves. This causes the cw and ccw RCP waves to oscillate at slightly different frequencies while the cw and ccw LCP waves are similarly but oppositely split. Thus, a laser gyro operates with right circular polarized waves biased in one direction of rotation and with left circular polarized waves biased in the opposite direction, the bias being cancelled by subtracting the two outputs.

Although a Faraday rotator provides non-reciprocal polarization rotation and has anti-reflection coating on both sides of its glass material, its insertion into the optical path results in some light energy being back-reflected by the rotator. In order to prevent these reflections from mixing with the main cw and ccw propagating waves, they must be absorbed or reflected away from the main propagating waves.

SUMMARY OF THE INVENTION

The invention discloses the utilization of a photon absorber to minimize the interaction between reflected electromagnetic waves and the main counter-traveling electromagnetic waves in a resonant optical cavity. Use of a photon absorber in a ring laser gyroscope application minimizes the width of the lock-in band at high angular rotation rates. A large lock-in band reduces the accuracy of said gyroscope. The insertion of a solid material into a resonant optical cavity for producing a direction-dependent phase shift to said waves resulting in a frequency splitting between said counter-traveling waves provides a means for reflections to occur.

The invention further discloses a multi-frequency ring laser gyroscope having a closed path with a gain medium for the propagation of a plurality of electromagnetic waves in opposite directions, each of said waves being of a different frequency, means for producing circularly polarized counter-traveling waves in said closed path arranged in pairs of first and second polarization sense, means for producing a direction-dependent phase shift to said waves resulting in a frequency splitting between counter-traveling waves in each of said pairs, and means for absorbing unwanted reflected electromagnetic waves from said electromagnetic wave producing means in said closed path. The laser gain medium comprises a mixture of helium and neon electrically excited by a discharge current between one or more anodes and a cathode. The closed path further comprises a plurality of reflectors for directing the main cw and ccw electromagnetic waves around said path; in addition, said path is non-planar for producing circularly polarized counter-traveling waves. A magnetooptical means comprising a Faraday rotator is disposed within said closed path for producing the direction-dependent phase shift to said waves and it also is a source of reflected electromagnetic waves. The Faraday rotator has a slight tilt with respect to the main optic axis so that reflected waves are directed away from the main counter-traveling electromagnetic waves and to a photon absorber where said reflected waves are absorbed. A first photon absorber is disposed in a first counterbore of said closed path on one side of a reflecting means such as a Faraday rotator and a second photon absorber is disposed in a second counterbore of said closed path on an opposite side of said reflecting means.

In one embodiment, a photon absorber is fabricated from light absorbing filter glass with alternate layers of silicon dioxide and titanium dioxide anti-reflection coatings. An absorber is secured in a counterbore of an optical cavity by means of a V-shaped retaining spring which provides both lateral and longitudinal forces. A hole exists in the center of a photon absorber for the passage of the main electromagnetic waves and the absorber further comprises an angulated surface for directing reflected waves away from the main counter-traveling electromagnetic waves.

In another embodiment, a photon absorber is fabricated from beryllium-copper forming a shield and an absorptive coating of titanium is deposited on the surface of said shield. A tool is used to insert the photon absorber shield into an optical cavity causing the shield to form a conical configuration. The shield is secured in a counterbore of an optical cavity by the outer circular edge of the shield pressing against the inside surface of an optical cavity. The angle provided by the conically shaped surface directs reflected waves away from the main counter-traveling electromagnetic waves which pass through a hole in the center of the conical shield photon absorber.

The invention further discloses a method of absorbing electromagnetic waves reflected from an intracavity element of a laser gyroscope system comprising the steps of propagating a plurality of counter-traveling electromagnetic waves within a closed path, each of said waves being of a different frequency, amplifying said waves in a gain medium which is common to at least a portion of the path of each of said waves, providing reciprocal polarization dispersive means and non-reciprocal polarization dispersion means for said waves in said closed path, and absorbing electromagnetic waves reflected from said polarization dispersive means. The step of absorbing reflected electromagnetic waves comprises disposing a first photon absorber in a first counterbore of said closed path on one side of an electromagnetic wave reflecting means and disposing a second photon absorber on an opposite side of said reflecting means without affecting the propagation of said counter-traveling waves.

BRIEF DESCRIPTION OF THE DRAWINGS

Other and further features and advantages of the invention will become apparent in connection with the accompanying drawings wherein:

FIG. 1 is an enlarged front view of a ring laser gyroscope optical block embodying the invention and showing the complete ring laser closed path;

FIG. 2 is a partial cross-sectional view from the front of the ring laser gyroscope optical block along line 2 in FIG. 3;

FIG. 7A is a side elevation cross-sectional view of a photon absorber made of light absorbing filter glass showing the anti-reflection coatings and angulated front surface;

FIG. 7B is a front elevational view of a photon absorber made of light absorbing filter glass showing the center hole and truncated side;

FIG. 8A is a side elevation cross-sectional view of a spring for securing the photon absorber of FIG. 7A and FIG. 7B in the ring laser gyro block of FIGS. 1-6;

FIG. 8B is a front elevational view of a spring for securing the photon absorber of FIG. 7A and FIG. 7B in the ring laser gyro block of FIGS. 1-6;

FIG. 9A is a side elevation cross-sectional view of a conical shield photon absorber made of beryllium-copper prior to insertion into a ring laser gyro showing an absorptive coating;

FIG. 9B is a front elevational view of a conical shield photon absorber made of beryllium-copper showing the center hole, an absorptive coating, and circular configuration prior to insertion into a ring laser gyro optical cavity;

FIG. 9C is an isometric view of the beryllium-copper conical shield in FIG. 9B showing its conical geometric configuration after being inserted into a ring laser gyro optical cavity;

DESCRIPTION OF THE PREFERRED EMBODIMENTS

Figure 4:
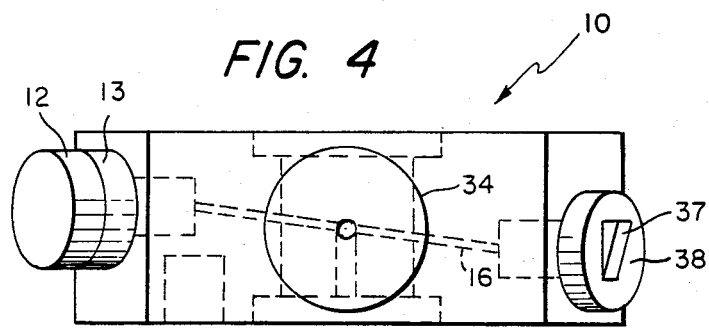
FIG. 4 is a back view of the ring laser gyroscope optical block embodying the invention.
Figure 3:
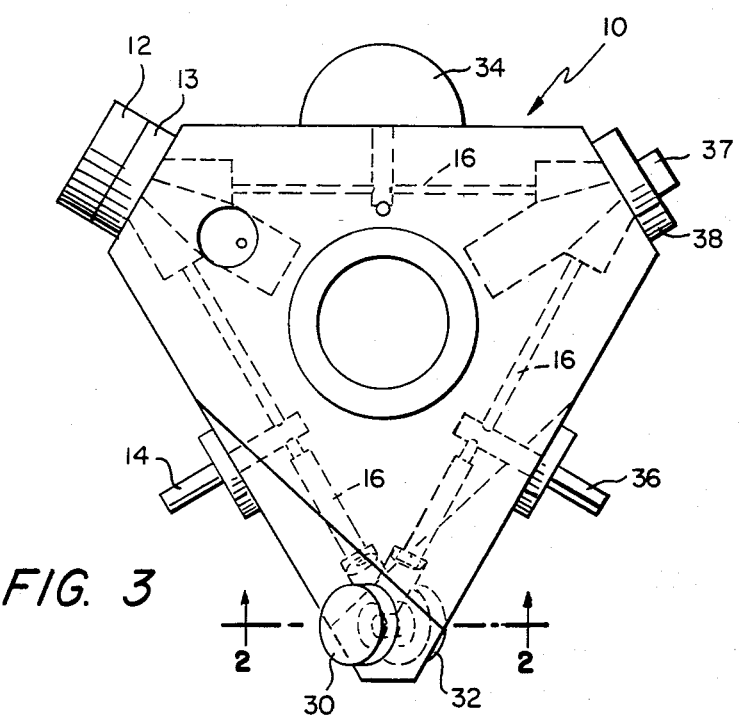
FIG. 3 is a top view of the ring laser gyroscope optical block embodying the invention.

Referring to FIGS. 1-6, a ring laser gyro block 10 is shown. Contained within the gyro block 10, as shown in FIG. 1, are a non-planar resonator cavity 16 which provides a closed path for the propagation of electromagnetic waves, four reflectors 13, 30, 32 and 38 for directing the waves around the closed path, a Faraday rotator assembly 28 which provides for non-reciprocal polarization rotation of the propagating waves, anodes 14 and 36, cathode 34 and a laser gain medium 39 within optical cavity 16 having a helium-neon gas mixture where the two active isotopes are neon 20 and neon 22. The gaseous gain medium 39 is electrically excited by discharge currents generated between the anodes 14 and 36 and cathode 34, and it becomes a light emitting laser gain medium or plasma sustaining the resonant laser waves in the optical cavity 16.

Reflector 13 is attached to a piezoelectric element 12 which moves the reflector in and out as part of a cavity path length control system. Reflectors 30 and 32 are used solely for reflecting the electromagnetic waves in the closed laser path. Reflector 38 is only partially reflective thereby allowing a small portion of the waves incident on its surface to pass through the reflector and be combined and processed to provide rotational information.

Gyro block 10 is preferably constructed with a material having a low thermal coefficient of expansion such as a glassceramic material to minimize the effects of temperature change upon a laser gyroscope system. A preferred commercially available material is sold under the name of Cer-Vit ™ material C-101 by Owens-Illinois Company; alternatively, Zerodur ™ by Schott Optical Co. may be used.

Two photon absorbers 24 and 26 are shown in FIG. 1. Photon absorber 24 is disposed at one end of counterbore 23 in the laser ring resonator cavity 16; photon absorber 26 is disposed at one end of counterbore 27 in resonator cavity 16. The absorbers 24 and 26 are positioned for absorbing reflected electromagnetic waves from the Faraday rotator assembly 28.

Referring now to FIG. 2, a partial cross-sectional view of the Faraday rotator assembly 28 is shown disposed in a segment of the laser cavity 16. Also shown is photon absorber 24 secured in its position in a counterbore 23 of the optical cavity 16 by a V-shaped beryllium-copper retaining spring 40; photon absorber 26 is secured in counterbore 27 also by a V-shaped beryllium-copper retaining spring 42. The Faraday rotator assembly 28 is positioned to have a slight tilt of approximately 5 degrees with respect to the optic axis 60 resulting in a tilt angle 61 so that a reflected wave 62 will be reflected away from the main laser wave or beam which propagates along the optic axis 60 in order to eliminate coupling between these waves. When a reflected wave 62 gets reflected from reflector 30, it strikes surface 44 of the photon absorber 24 and it is absorbed. Likewise, reflected wave 64 from the Faraday rotator assembly 28 strikes surface 46 of photon absorber 26 after being reflected from reflector 32 and it is absorbed.

The Faraday rotator assembly 28 located within the laser beam cavity 16 is a layered assembly comprising a first permanent magnet 47, a spacer 54 which is part of the material forming the gyro block 10, a Faraday disk 48, a second spacer 50 made of the same material as the first spacer and a second permanent magnet 52. These elements making up a Faraday rotator assembly 28 have a hole in the middle of each element except the Faraday disk 48 which is solid. Anti-reflection coatings are applied to the Faraday disk 48 to reduce the amount of reflections from the rotator. A longitudinal magnetic field is provided in the Faraday disk but this field attenuates rapidly upon moving a short distance away from the magnets so that negligible stray magnetic field extends into the gaseous discharge region of the optical cavity 16 which could produce unwanted modes or frequency offset. The Faraday disk 48 may be preferably formed of a rare earth-doped glass or a material of similarly high Verdet constant. Traditional Faraday rotators have employed a thick slab of material, often fused quartz. Any solid material in the path of the counter-rotating beams will introduce scatter points which exhibit a sensitivity to thermal fluxes. This sensitivity may be due to the thermal expansion of the material or to a change in the optical path length due to the temperature dependence of the refractive index of the material. The effective temperature dependence of the optical path length, and therefore the thermally induced drift, has been found to be a strong positive function of the thickness of the solid material in the path of the beams. Thus, it is desirable to use as thin a disk as possible; a thickness of 0.5 mm or less is preferred to reduce drift to an acceptable level. This will minimize the variation of the thickness due to temperature or other causes substantially to less than one wavelength of the laser waves over the operating region. A commercially available material is Hoya Optics, Inc. material No. FR-5 which is a glass doped with paramagnetic material to provide for the Faraday rotation and results in a rotator having an isotropic refractive index. This was found to be important since a problem of a traditional Faraday rotator is that a crystal material such as crystalline quartz has an anisotropic refractive index which introduces elliptical bi-refringence. This depolarizes the nominally circularly polarized waves and leads to increased coupling between the counter-rotating waves. Thus, it is important to use an isotropic material for the Faraday disk to eliminate depolarization of the resonant modes. Operating as close to circular polarization as possible reduces cross-coupling and therefore reduces thermally induced drifts due to any remaining scatter centers. This allows a gyro system to achieve stability levels corresponding to a variation in time of the output frequency of a few hertz or better.

Referring now to FIG. 7A, a side elevation cross-sectional view of photon absorber 24 and 26 is shown. The material used for the photon absorber is light absorbing filter glass 74 commercially available from Corning Glass Co. as type CS 7-37 or type CS 7-60. To further improve the effectiveness of the absorber, two layers of silicon dioxide ($SiO_2$) and titanium dioxide ($TiO_2$) anti-reflection coatings 70 and 72 are applied to the angulated surface 75 of the photon absorber. The wedge shaped front surface 75 is angulated so that if any portion of a reflected wave reflects off the absorber, it will be aimed out of the gyro block 10 and away from the optic axis 60. FIG. 7B shows a hole 54 in the photon absorber for the passage of the main electromagnetic waves. The bottom surface 78 of the absorber is truncated so that a beryllium-copper V-shaped spring 40, 42, as shown in FIG. 8A and FIG. 8B has sufficient surface area to secure a photon absorber into its counterbore position in a ring laser gyro block cavity. The V-shaped spring 40, 42 provides both a lateral and longitudinal force when placed between a photon absorber and an optical cavity.

Referring now to FIG. 9A and FIG. 9B, an alternate embodiment of a photon absorber is shown, for preventing reflected light energy from coupling into the main beams within the gyro block, comprising a shield 92 with a layer of an absorptive coating 94. The shield 92 is comprised of a beryllium-copper material with a titanium coating 94 deposited on the surface of said shield. The shield 92 has the form of a thin disk with a center hole 95 and with a triangular-shaped sector 96 of the disk removed. The center hole permits the unobstructed passage of the main laser waves when the shield is inserted into an optical cavity. The insertion of the shield into a cylindrical optical cavity of a gyro is performed with a tool (not shown) that forms the shield 97 into a conical geometric configuration as shown in FIG. 9C. This conical configuration is maintained by the outer circular edge of the shield pressing against the inside surface of an optical cavity. A conical shield 97 may be used in place of the filter glass absorbers 24 and 26 as shown in FIG. 1 and FIG. 2. The shield 97 prevents electromagnetic waves from passing through it and back into the gyro block where such waves could couple with the main laser beams.

Figure 10:
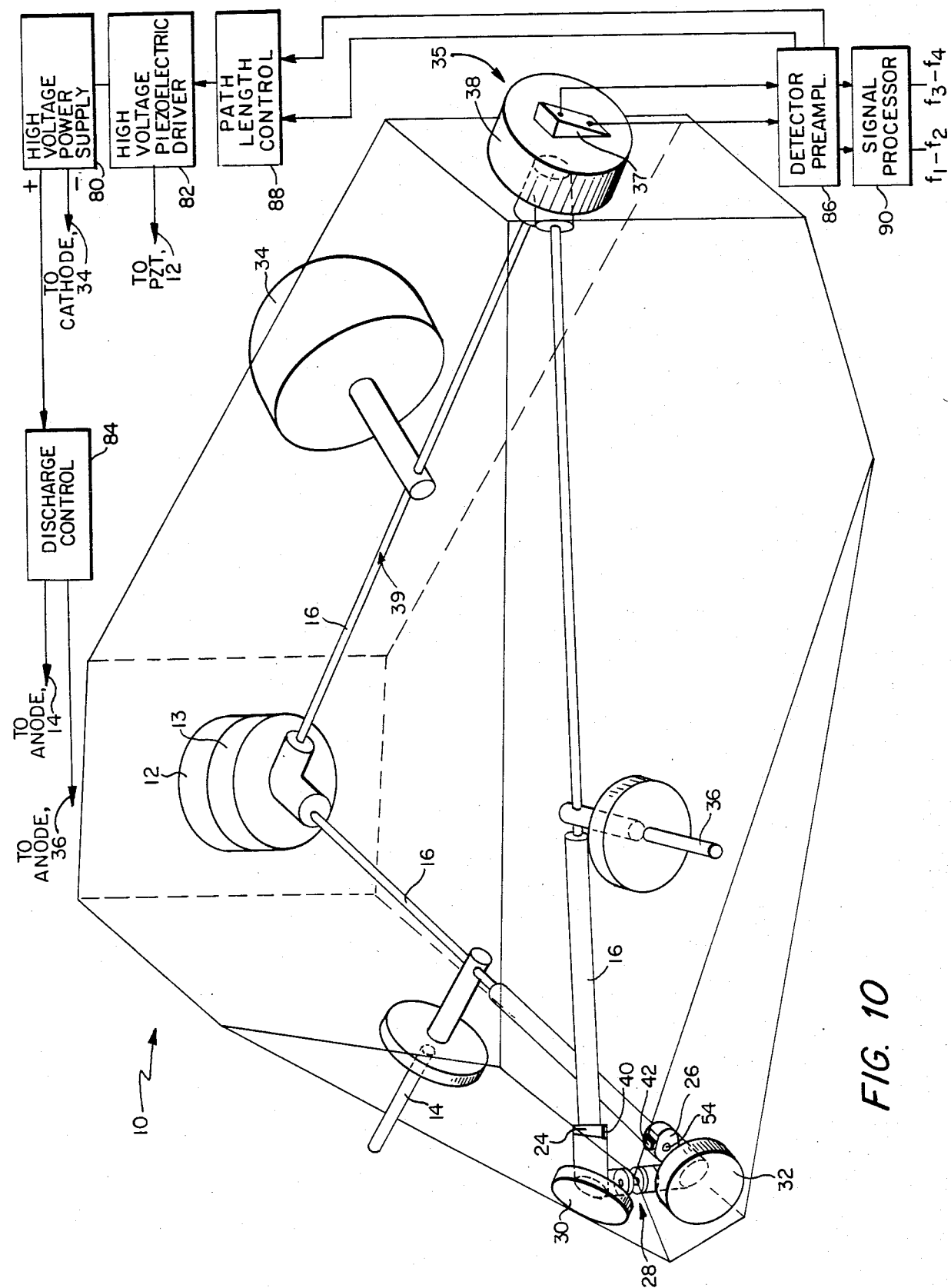
FIG. 10 is a block diagram of a ring laser gyroscope system incorporating an isometric view of the gyro block illustrated in FIGS. 1-6.
Figure 11:
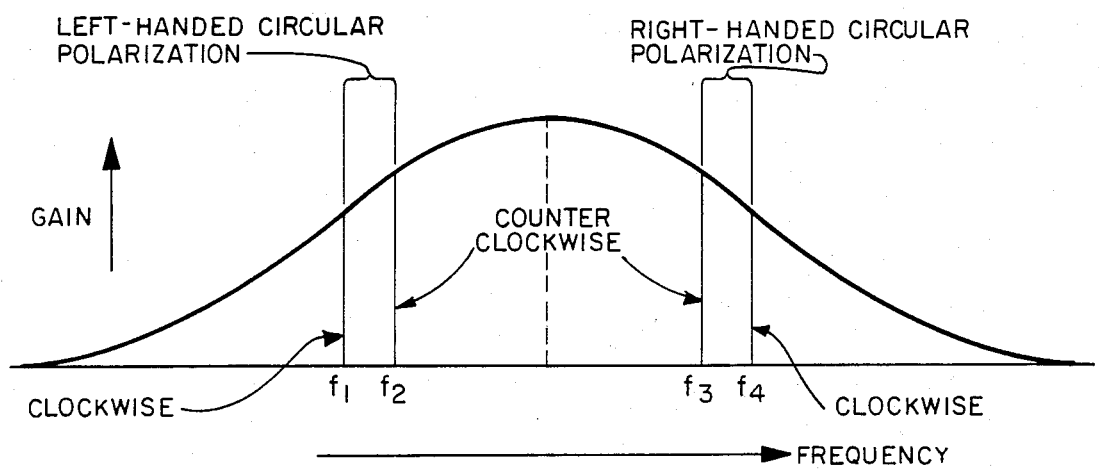
FIG. 11 is a graph showing the gain versus frequency characteristics of the ring laser gyroscope system of FIG. 10 indicating the relative positions of the frequencies of the four waves within the system.

Referring now to FIG. 10, the photon absorbers 24 and 26 are shown in ring laser gyro block 10 with supporting electronics for maintaining the propagation of the electromagnetic waves in the optical cavity 16. This laser gyroscope system of the preferred embodiment, employing four waves or frequencies, operates in the manner described in the incorporated patents referenced above in the Background of the Invention. The electromagnetic laser waves propagate along the closed or re-entrant ring path 16. FIG. 11 shows a laser medium gain curve with the position of the frequencies of the four waves indicated. Waves of frequency $f_1$ and $f_4$ circulate in the clockwise direction while waves of frequency $f_2$ and $f_3$ circulate in the counter-clockwise direction. All four waves are preferably circularly polarized with waves of frequencies $f_1$ and $f_2$ being left-hand circularly polarized (LCP) and waves of frequencies $f_3$ and $f_4$ being right-hand circularly polarized (RCP).

The ring laser closed path 16 in FIG. 10 comprises a non-planar ring which inherently supports only circularly polarized waves without the use of a crystal rotator. The placement of reflectors 13, 30, 32 and 38 in the ring path 16 produces a phase alteration which alters the resonant frequencies of the waves. The result, as shown in FIG. 11, is that the waves of left-hand circular polarization ($f_1$ and $f_2$) will have a resonant frequency different from the resonant frequency of the right-hand circular polarized waves ($f_3$ and $f_4$). This non-planar electromagnetic wave ring resonator is shown and described in U.S. Pat. No. 4,110,045 to Irl W. Smith, Jr. and Terry A. Dorschner and assigned to the present assignee.

The Faraday rotator assembly 28 is shown in one of the segments of the ring non-planar laser path 16 between reflectors 30 and 32. This non-reciprocal magneto-optical device produces a phase delay bias for waves of either circular polarization sense traveling clockwise which is different from that for waves of similar polarization traveling counterclockwise. The combination of reflectors 13, 30, 32 and 38 and the Faraday rotator 28 is such that the ring resonator supports waves having frequencies of oscillation as shown in FIG. 11. However, there are other alternative means for accomplishing the same results as the Faraday rotator. One such means utilizing the Zeeman effect is described in U.S. Pat. No. 4,229,106 to Terry Dorschner et al. and assigned to the present assignee.

Figure 5:
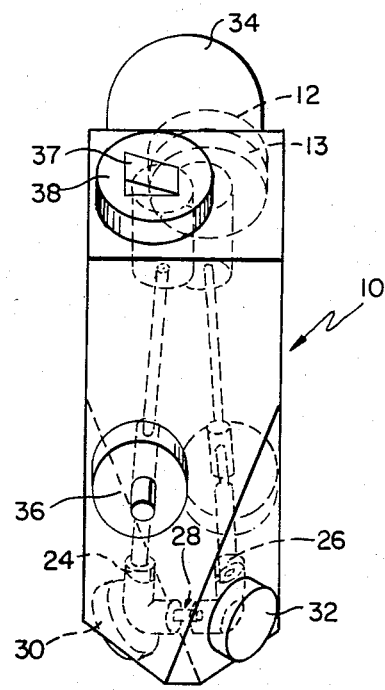
FIG. 5 is a side view of the ring laser gyroscope optical block embodying the invention.
Figure 6:
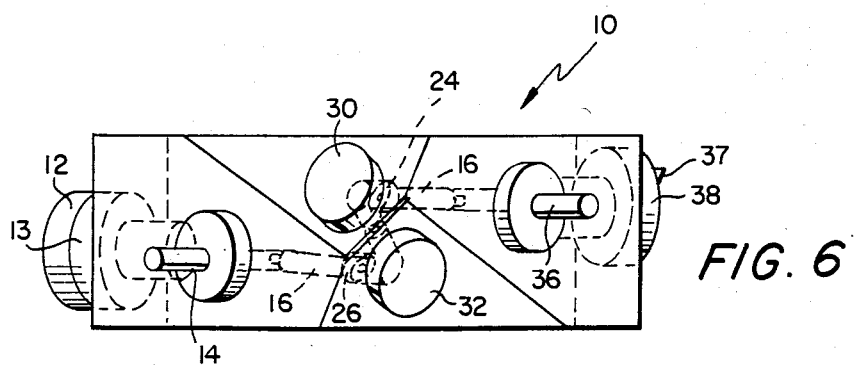
FIG. 6 is a front view of the ring laser gyroscope optical block embodying the invention.

In addition to the laser gyroscope block 10, FIG. 5 shows connections to associated laser gyroscope electronics and optics. The high voltage power supply 80 provides a high negative voltage to the cathode 34 and a high positive voltage to the piezoelectric driver 82. Discharge control electronics 84 provides regulation of the current flowing from the anodes to the cathode; different gyro blocks may require different values of cathode current depending on the optical losses within the particular gyro block.

The path length control system is a feedback network which maintains a consistent and optimum optical path length within the gyro cavity 16. It comprises the detector preamplifier 86, path length control 88 and high voltage piezoelectric driver 82 electronics. The optical path length is controlled by means of a reflector 13 which is mounted on a piezoelectric transducer (PZT) 12. The high voltage driver operates the PZT 12 with an applied voltage ranging from 0 volts to 400 volts. Since stable operating points or modes occur at path length intervals equal to one-half the laser wavelength, the mode which is closest to the center of the transducer's dynamic range will normally be chosen as a permanent operating point. The detector preamplifier 86 separates the AC signals and DC signals received from the output optics 35. The DC signals are used for the path length control. The AC signals are sine waves representing the gyro output, and they are sent to the signal processor 90 where they are converted into two digital pulse streams ($f_1-f_2$ and $f_3-f_4$) with one pulse produced for each cycle within the incoming voltage waveforms. The pathlength control is fully described in U.S. Pat. No. 4,108,553 to Albert N. Zampiello and Bradley J. Patch, Jr. and assigned to the present assignee. The specification of this patent being incorporated herein by reference.

The output optics 35 extracts a portion of each beam circulating within the laser cavity to produce the two output signals, $f_1-f_2$ and $f_3-f_4$, each one of which represents the difference in frequency between wave pairs having the same sense of circular polarization within the cavity as shown in FIG. 11. The output reflector 38 has a transmission coating on one side and a beamsplitter coating on the other side. Both coatings are a standard type using alternate layers of $TiO_2$ and $SiO_2$. The beamsplitter coating transmits half the incident intensity and reflects the other half. A retroreflecting prism 37 is used to heterodyne the two beams. This right angle prism is made of fused quartz and has silvered reflective faces. A dielectric coating is used between the silver and fused quartz to obtain minimal phase error upon reflection. A quarterwave plate followed by sheet polarizers are used to separate the four frequencies present in each beam. A wedge is used between the retroreflecting prism and the quarterwave plate to prevent reflections from the interfaces from propagating back into the gyro cavity and mixing with the counter-rotating beams. A photo-diode cover glass (anti-reflection coated on one side) and a photo-diode package complete the output optics 35. An optical cement is used between the various interfaces to provide adhesion and to minimize reflections. The output optics is fully described in U.S. Pat. No. 4,141,651 to Irl W. Smith and Terry A. Dorschner and assigned to the present assignee, the specification of this patent being herein incorporated by reference.

This concludes the description of the embodiments of the invention described herein. However, many modifications and alterations will be obvious to one skilled in the art without departing from the spirit and scope of the inventive concept. Therefore, it is intended that the scope of this invention be limited only by the appended claims.

What is claimed is:

1. In combination:
    means for producing a plurality of counter-traveling electromagnetic waves within a closed path with a gain medium;
    means for producing a direction-dependent phase shift to said waves resulting in a frequency splitting between said counter-traveling waves; and
    means for absorbing electromagnetic waves reflected from said direction-dependent frequency splitting means, said absorbing means comprising a conical shield with a light wave absorptive coating deposited on said shield.

2. In combination:
    a laser gyroscope having a closed path with a gain medium for the propagation of a plurality of electromagnetic waves in opposite directions, each of said waves being of a different frequency;
    means for producing circularly polarized counter-traveling electromagnetic waves in said closed path arranged in pairs of a first and second polarization sense;
    means for producing a direction-dependent phase shift to said waves resulting in a frequency splitting between counter-traveling waves in each of said pairs; and
    means for absorbing electromagnetic waves reflected from said phase shift producing means in said closed path, said absorbing means comprising a conical shield having a light wave absorptive coating of berylium-copper material deposited on said shield.

3. The combination as recited in claim 2 wherein:
    said absorbing means comprises means for passage of a substantial portion of said counter-traveling electromagnetic waves.

4. In combination:

laser gyroscope having a cavity with a gain medium for the propagation of a plurality of electromagnetic waves in opposite directions, each of said waves being of a different frequency;

means for providing Faraday rotation disposed within said cavity;

means for absorbing electromagnetic waves reflected from said Faraday rotation means and for allowing a substantial portion of said electromagnetic waves in said cavity to pass through said rotation means and said absorbing means, said absorbing means comprising a conical shield having a light wave absorptive coating of material deposited on said shield; and said Faraday rotation means being further positioned to direct said reflected waves toward said absorbing means.

5. The combination as recited in claim 4 wherein:

said absorbing means comprises means for directing a portion of said reflected electromagnetic waves away from said electromagnetic waves in said cavity.

6. In combination:

a laser gyroscope having a cavity with a gain medium for the propagation of a plurality of electromagnetic waves in opposite directions, each of said waves being of a different frequency;

means for producing circularly polarized counter-traveling electromagnetic waves in a closed path of said cavity arranged in pairs of a first and seocnd polarization sense;

means for producing a direction-dependent phase shift to said waves resulting in a frequency splitting between counter-traveling waves in each of said pairs; and a first photon absorber disposed in a first counterbore of said cavity on one side of a reflecting means and a second photon absorber disposed in a second counterbore of said cavity on an opposite side of said reflecting means, each of said first photon absorber and said second photon absorber comprising a conical shield having a light wave absorptive coating of material deposited on said shield.

7. The combination as recited in claim 6 wherein:

said first photon absorber and said second photon absorber comprise means for passage of a substantial portion of said counter-traveling electromagnetic waves.

8. The method of absorbing electromagnetic waves reflected from an intracavity element of a laser gyroscope system comprising the steps of:

propagating a plurality of counter-traveling electromagnetic waves within a closed path, each of said waves being of a different frequency;

amplifying said waves in a gain medium which is common to at least a portion of the path of each of said waves;

providing non-reciprocal polarization dispersive means for said waves in said closed path; and absorbing a substantial portion of said electromagnetic waves reslected from said polarization dispersive means with one or more conical shields having a light wave absorptive coating of material deposited on said shield.

9. The method as recited in claim 8 wherein:

said step of absorbing a substantial portion of said reflected electromagnetic waves comprises disposing a first one of said conical shields on one side of said polarization dispersive means and disposing a second one of said conical shields on an opposite side of said polarization dispersive means without affecting the propagation of said counter-traveling electromagnetic waves.

* * * * *